United States Patent
Bendigeri et al.

(10) Patent No.: US 9,766,977 B2
(45) Date of Patent: *Sep. 19, 2017

(54) SYSTEM AND METHOD FOR IMPROVING READ PERFORMANCE OF A DISTRIBUTED PARITY RAID SOLUTION

(71) Applicant: Dell Products, LP, Round Rock, TX (US)

(72) Inventors: Avinash Bendigeri, Dharwad (IN); Kiran K. Devarapalli, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/537,046

(22) Filed: Nov. 10, 2014

(65) Prior Publication Data

US 2016/0132393 A1 May 12, 2016

(51) Int. Cl.
- *G11C 29/00* (2006.01)
- *G06F 11/10* (2006.01)
- *G06F 3/06* (2006.01)

(52) U.S. Cl.
CPC ......... *G06F 11/1076* (2013.01); *G06F 3/064* (2013.01); *G06F 3/0619* (2013.01); *G06F 3/0689* (2013.01); *G06F 2211/1057* (2013.01); *G06F 2211/1059* (2013.01)

(58) Field of Classification Search
CPC .... G06F 11/1076; G06F 3/0689; G06F 3/064; G06F 3/0619
See application file for complete search history.

(56) References Cited

U.S. PATENT DOCUMENTS

| | | |
|---|---|---|
| 5,911,779 A | 6/1999 | Stallmo et al. |
| 7,831,768 B2 | 11/2010 | Ananthamurthy et al. |
| 8,566,673 B2 | 10/2013 | Kidney et al. |
| 2003/0221065 A1* | 11/2003 | Inagaki ................ G06F 3/0611 711/114 |
| 2003/0237019 A1 | 12/2003 | Kleiman et al. |
| 2008/0065930 A1 | 3/2008 | Byrne et al. |
| 2009/0113235 A1 | 4/2009 | Selinger |
| 2010/0011162 A1 | 1/2010 | Wang et al. |
| 2011/0307660 A1 | 12/2011 | Yang |
| 2015/0109894 A1* | 4/2015 | Shimomai .............. G11B 20/10 369/47.15 |

OTHER PUBLICATIONS

U.S. Appl. No. 14/329,574, filed Jul. 11, 2014.

* cited by examiner

*Primary Examiner* — Guy Lamarre
(74) *Attorney, Agent, or Firm* — Larson Newman, LLP

(57) ABSTRACT

An information handling system includes a plurality of storage disks arranged as a redundant array of independent disks and a controller. The controller communicates with each of the storage disks. The controller determines a total amount of storage space utilized to store parity information within the storage disks based on a smallest disk size of the storage disks and a number of storage disks in the redundant array of independent disks, calculates an amount of storage space utilized to store parity information on each of the disks based on the total amount of storage space utilized to store parity information and the number of storage disks, and allocates a parity region of sectors within each of the storage disks to store the parity information. The parity region is an inner most region of a disk.

20 Claims, 3 Drawing Sheets

SYSTEM AND METHOD FOR IMPROVING READ PERFORMANCE OF A DISTRIBUTED PARITY RAID SOLUTION

FIELD OF THE DISCLOSURE

The present disclosure generally relates to system and method for improving read performance of a distributed parity RAID solution.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems utilize redundant array of independent disks (RAID) to provide data redundancy and to improve performance of the memory devices. Depending on the RAID solution implemented in the information handling system, the number of disks utilized in the RAID configuration can vary, and parity information can be stored on one or more of the disks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
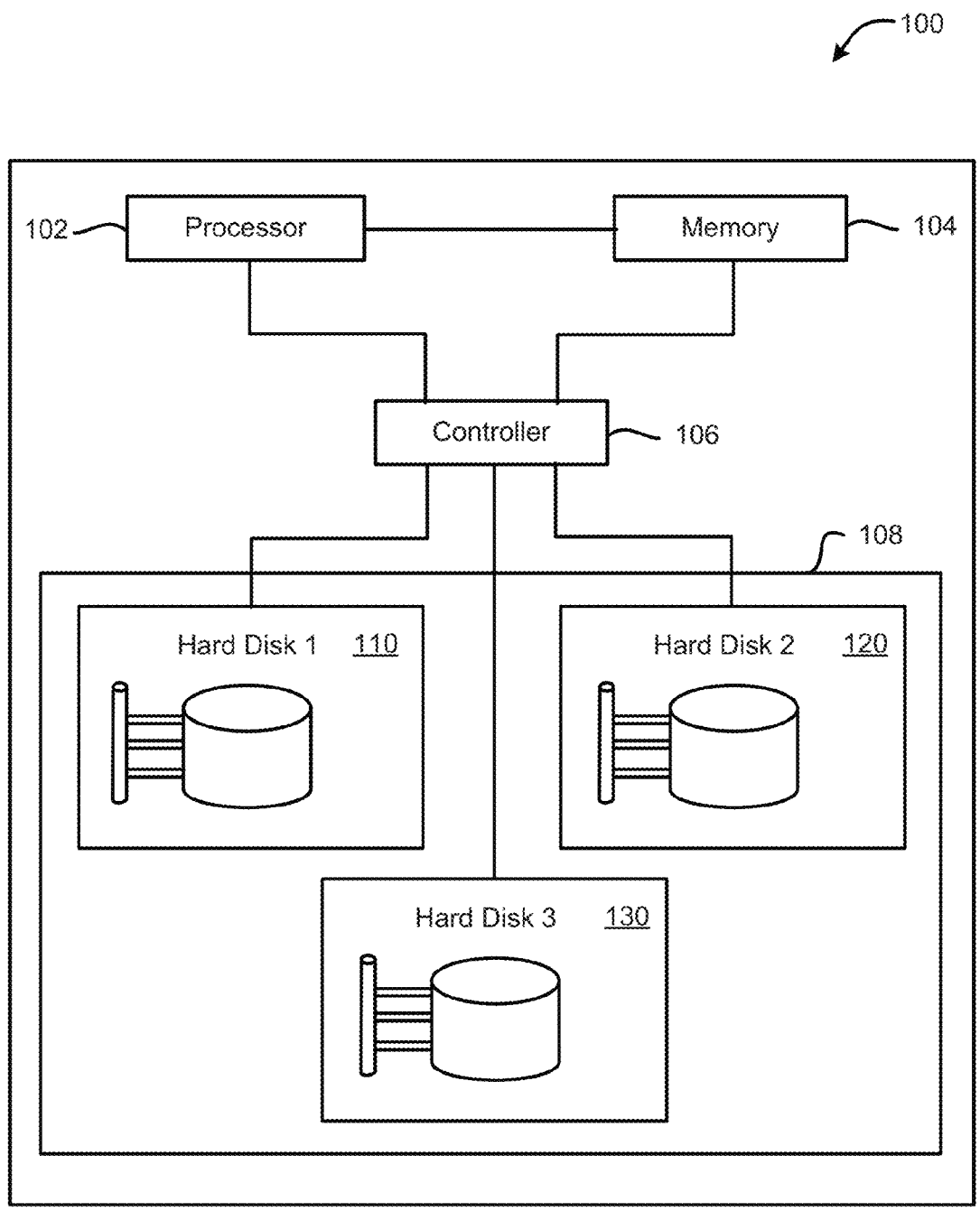
FIG. 1 is a block diagram of an information handling system.

FIG. 1 shows an information handling system 100. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system 100 includes a processor 102, memory 104, controller 106, and a disk array 108, which in turn can include a disk drive 110, a disk drive 120, and a disk drive 130. In an embodiment, the controller 106 may determine where on each of disk drives 110, 120, and 130 to write particular data, such as choosing to write parity information to an inner track of one of disk drives 110, 120, and 130 and regular data to an outer track of the same disk drive. In response to receiving a read request for a portion of data that is stored on both disk drives 110, 120, and 130, controller 106 may choose which of disk drives 110, 120, and 130 to read the portion of data from based on which of disk drives 110, 120, and 130 have the portion of data stored on an outer track.

In different embodiments, the processor 102 may include any system, device, or apparatus operable to interpret and/or execute program instructions and/or process data. The processor 102 may include one or more: microprocessors, micro controllers, digital signal processors (DSP), application specific integrated circuits (ASIC), or another digital or analog circuitry configured to interpret and/or execute program instructions and/or process data. In some embodiments, processor 102 may interpret and/or execute program instructions and/or process data stored locally, such as in memory 104. In the same or alternative embodiments, processor 102 may interpret and/or execute program instructions and/or process data stored remotely.

The memory 104 may include any system, device, or apparatus operable to retain and/or retrieve program instructions and/or data for a period of time, such as a computer-readable media. The memory 104 may also include one or more modules; such modules can include random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In some embodiments, disk array 108 may form all or part of a redundant storage array, such as a Redundant Array of Independent Disks (RAID) configuration. For example, disk array 108 may be configured as a three disk RAID-5 solution. In this example, parity information can be stored on one disk worth of the total disk space of the RAID configuration. In another embodiment, the disk array 108 may be configured as a six disk RAID-6 solution. In this embodiment, parity information can be stored on two disks worth of the total disk space of the RAID configuration. In different embodiments, the disks 110, 120, and 130 of the disk array 108 can include different number of platters and different numbers of read/write heads. However, for clarity the disks 110, 120, and 130 will be discussed with respect to having only one platter and only one read/write head per disk.

In particular embodiments, controller 106 may be a hardware or hardware-based disk array controller, a software, software-based, or operating-system-based disk array controller, and/or a firmware or driver-based disk array controller. Disk array controller 106 may be configured for managing distribution of data across the plurality of disk drives 110, 120, and 130 of disk array 108. Controller 106 may perform the data distribution management in response to commands (e.g., read commands, write commands) received by controller from processor 102. In some embodiments, controller 106 may comprise a RAID controller. For example, if RAID is implemented using disk array 108, then controller 106 may configure how stored data is mirrored and/or striped across the plurality of disk drives 110, 120, and 130.

In some embodiments, one or more aspects of controller 106 may be an integral part of a storage enclosure housing disk array 108, an integral part of information handling system 100, embedded into the firmware or software of the operating system of the information handling system 100, embedded in one or both of disk drives 110, 120, and 130, or the like. Disk drives 110, 120, and 130 may comprise any suitable system, device, or apparatus used for storing and retrieving digital information; for example, disk drives 110 and 120 may be hard disk drives (HDD), serial advanced technology attachment (SATA) drives, parallel advanced technology attachment (PATA) drives, or integrated drive electronics (IDE) drives. Disk drives 110, 120, and 130 may consist of one or more rotating disks or platters that contain two surfaces for data storage on each side of the disks. The platters may have magnetic heads and may be arranged on a moving actuator arm to read data from, and write data to, the disk surfaces. In certain embodiments, disk drives 110, 120, and 130 may comprise different RAID configurations, such that their individual disks contain parity information and data.

During a pre-initialization period, the controller 106 can create virtual disks within the RAID configuration. The creating of virtual disks within the RAID configuration will be described with respect to both a RAID-5 solution with single parity and three hard disks, such as hard disk 110, 120, 130, and a RAID-6 solution with dual parity and six hard disks. The controller 106 determines the number of disks (N) in the RAID configuration, the parity (P) for the RAID configuration, and a smallest disk in terms of disk space (Ds) in the RAID configuration, such as one of the disk drives 110, 120, and 130. The controller 106 then calculates a total disk space utilized for storing the parity information (Ps) using equation 1 below:

$$Ps=Ds*P \qquad (EQ. 1)$$

In an embodiment, the RAID-5 solution has a single parity, such that the storage capacity of the smallest disk size is used as the storage space, Ps, for the parity information. For example, if disk size for the disk drives 110, 120, and 130 are all the same, such as 3 Tb, the storage space, Ps, in the entire RAID configuration utilized for the parity information is 3 Tb. In another embodiment, the RAID configuration can be RAID-6 with dual parity. In this embodiment, the storage space, Ps, for the parity information is equal to the storage capacity of two complete disks of the smallest disk space, Ds. For example, if the disk space of each disk in the RAID configuration is 3 Tb, the storage space, Ps, for the parity information would be twice the disk space of the smallest disk, such as 6 Tb. For simplicity, each of the disks in the RAID configurations is defined as having the same disk space. However, in other embodiment, the disk space can vary between disks 110, 120, and 130 in the RAID configuration.

In an embodiment, the parity information can be evenly distributed between the disks of the RAID configuration. In this embodiment, the controller 106 can calculate an amount of disk space on each disk ($P_D$) utilized for the parity information using equation 2 below:

$$P_D = \frac{P_S}{N} \qquad (EQ. 2)$$

In the RAID-5 configuration, Ps equals the storage capacity of a single disk, 3 Tb, divided by the number of disks in the configuration, such as 3. Therefore, using equation 2 above, the space on each disk, $P_D$, is used to store the parity information is 1 Tb. In the RAID-6 configuration described above, Ps equals the storage capacity of two disks, 6 Tb, divided by the number of disks in the configuration, such as 6. Therefore, using equation 2 above, the space on each disk, $P_D$, is used to store the parity information is 1 Tb.

The controller 106 can then determine the amount of disk space available to store actual data, $S_D$, on each disk of the RAID configuration. This determination can be made by subtracting the amount of disk space for parity information, $P_D$, from the total disk space, Ds, of the disk as shown in equation 3 below:

$$S_D=Ds-P_D \qquad (EQ. 3)$$

Continuing the RAID-5 configuration example, the amount of disk space, Ds, on each disk 110, 120, and 130 is 3 Tb and the amount of disk space for the parity information on each disk, $P_D$, is 1 Tb. Therefore, using equation 3 above, the space on each disk for actual data, $S_D$, is 2 Tb. In the RAID-6 configuration, the amount of disk space, Ds, on each disk is 3 Tb and the amount of disk space for the parity information on each disk, $P_D$, is 1 Tb. Therefore, using equation 3 above, the space on each disk in a RAID-6 configuration for actual data, $S_D$, is 2 Tb.

The controller 106 can continue configuring the virtual disks in the disk array 108 by determining the total number of sectors available on the smallest disk, Sn, the size of each sector on the smallest disk, Sz. In an embodiment, the controller 106 can define the size of a sector to The controller can then define the total disk space on the smallest disk, Ds, in terms of the number of sectors available and the size of the sectors as shown in equation 4 below:

$$Ds = Sn * Sz \qquad \text{(EQ. 4)}$$

In an embodiment, the sector size, Sz, can be 512 bytes, and as a result the number of sectors in each disk, Sn, of both RAID configurations can be 5.86E6 sectors. The controller 106 can also determine the number of sectors reserved for parity information on each disk of the disk array 108 by using equation 5 below:

$$P_{sector} = \frac{P_D}{Sz} \qquad \text{(EQ. 5)}$$

Figure 2:
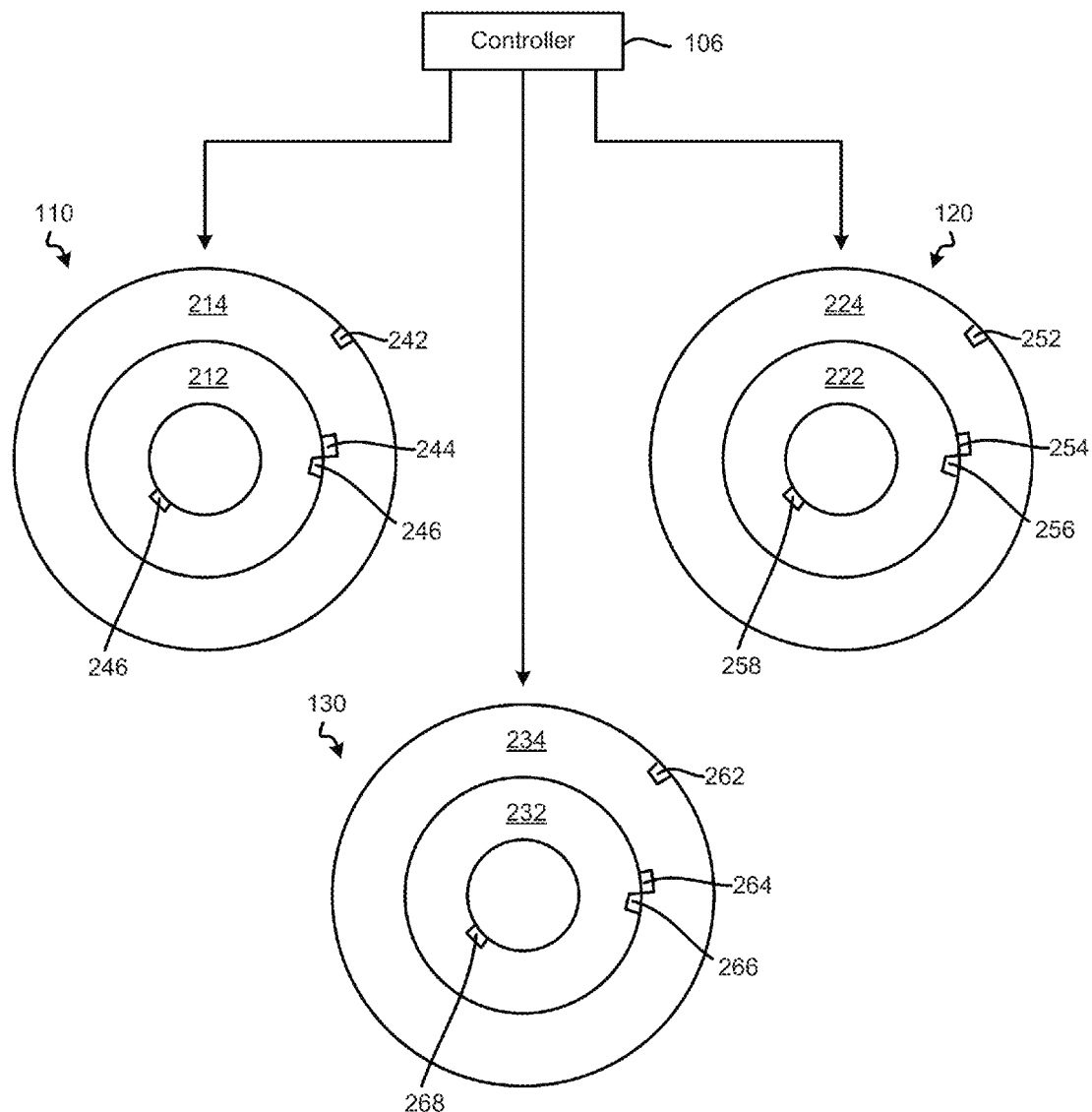
FIG. 2 is a diagram of different sectors of disks in an array of disks of the information handling system.

In the RAID-5 configuration example, the amount of disk space for parity information, $P_D$, on each disk 110, 120, and 130 is 1 Tb and number of sectors is 5.86E6. Therefore, using equation 5 above, the number of sectors reserved for parity information, $P_{sectors}$, is 1.95E6. In the RAID-6 configuration, the number of sectors reserved for parity information, $P_{sectors}$, is also 1.95E6. The controller 106 can then assign or reserve the interior 1.95E6 sectors of the hard disks 110, 120, and 130 as respective parity virtual disks 212, 222, and 232 as shown in FIG. 2.

The controller can also calculate the percentage of sectors reserved for parity information, $P_{sectors}$ %, based on the number of sectors for the parity information, $P_{sectors}$, divided by the total number of sectors, Sn, and the result is then multiplied by 100, as shown in equation 6 below:

$$P_{sector}\% = \frac{P_{sector}}{Sn} * 100 \qquad \text{(EQ. 6)}$$

Using equation 6, the controller 106 can calculate that 33.33% of the total sectors of each disk is reserved for parity information in both the RAID-5 and RAID-6 configurations.

The controller 106 can also determine the number of sectors reserved for data on each disk of the disk array 108 by using equation 7 below:

$$D_{sector} = \frac{S_D}{Sz} \qquad \text{(EQ. 7)}$$

In the RAID-5 configuration example, the amount of disk space for actual data, $S_D$, on each disk 110, 120, and 130 is 2 Tb and number of sectors is 5.86E6. Therefore, using equation 7 above, the number of sectors reserved for actual data, $D_{sectors}$, is 3.91 E6. In the RAID-6 configuration, the number of sectors reserved for parity information, $D_{sectors}$, is also 3.91E6. The controller 106 can then assign or reserve the outer 3.91E6 sectors of each of the hard disks 110, 120, and 130 as respective data virtual disks 214, 224, and 234 as shown in FIG. 2.

The controller can also calculate the percentage of sectors reserved for actual data, $D_{sectors}$ %, based on the number of sectors for the parity information, $D_{sectors}$, divided by the total number of sectors, Sn, and the result is then multiplied by 100, as shown in equation 8 below:

$$D_{sector}\% = \frac{D_{sector}}{Sn} * 100 \qquad \text{(EQ. 8)}$$

Using equation 8, the controller 106 can calculate that 66.67% of the total sectors of each disk is reserved for actual data in both the RAID-5 and RAID-6 configurations. The controller 106 can then complete the initialization of the virtual disk by defining sector ranges in each of the disks 110, 120, and 130. In an embodiment, the sectors can be identified from the outer edge of the disk towards the center of the disk.

Referring now to FIG. 2, the controller 106 can complete the initialization of the virtual disk by assigning the region of disk 110 reserved for actual data to be defined by Sector(0) 242 to Sector($D_{sectors}$−1) 244. The controller 106 can also defined the region of the disk 110 reserved for parity information to include Sector($D_{sectors}$) 246 to Sector(Sn−1) 248. The controller 106 can then assign the regions of disk 120 and define the data region to include Sector(0) 252 through Sector($D_{sectors}$−1) 254. The controller 106 can also defined the parity information region of the disk 120 to include Sector($D_{sectors}$) 256 to Sector(Sn−1) 258. The controller 106 can assign the regions of disk 130 and define the data region to include Sector(0) 262 through Sector($D_{sectors}$−1) 264, and the parity information region of the disk 120 to include Sector($D_{sectors}$) 266 to Sector(Sn−1) 268.

During write accesses to the disks 110, 120, and 130 of the disk array 108, the controller 106 can first determine the disk to access and then determine whether the information to write is actual data or parity information. If the controller 106 determines that the information is to be written to disk 110 and that the information is actual data, the controller can write the data to the data sector range of disk starting with the outer most sector of the disk, Sector(0) 242, and moving toward inner most sector of the data range, Sector($D_{sectors}$−1) 244, with each subsequent write. However, if the information is parity information, the controller 106 can write the parity information to the parity information sector range of disk 110 starting with inner most sector of the parity information range, Sector(Sn−1) 248 and moving toward the out-most sector of the parity information range, Sector($D_{sectors}$) 246 with each subsequent write.

If the controller 106 determines that the information is to be written to disk 120 and that the information is actual data, the controller can write the data to the data sector range of disk starting with the outer most sector of the disk, Sector(0) 252, and moving toward inner most sector of the data range, Sector($D_{sectors}$−1) 254, with each subsequent write. However, if the information is parity information, the controller 106 can write the parity information to the parity information sector range of disk 110 starting with inner most sector of the parity information range, Sector(Sn−1) 258 and moving toward the out-most sector of the parity information range, Sector($D_{sectors}$) 256 with each subsequent write.

If the controller 106 determines that the information is to be written to disk 130 and that the information is actual data, the controller can write the data to the data sector range of disk starting with the outer most sector of the disk, Sector(0) 262, and moving toward inner most sector of the data range, Sector($D_{sectors}$−1) 264, with each subsequent write. However, if the information is parity information, the controller 106 can write the parity information to the parity information sector range of disk 110 starting with inner most sector of the parity information range, Sector(Sn−1) 268 and moving toward the out-most sector of the parity information range, Sector($D_{sectors}$) 266 with each subsequent write.

In an embodiment, the outer sectors of a disk 110, 120, or 130 can be accessed faster than inner sectors. In this embodiment, the actual data can be accessed more often than the parity information, such that performance of the disk array 108 for reads and writes can improve when the data range of the disks 110, 120, and 130 includes the outer sectors of the disk and the parity information range includes the inner sectors of the disk as compared to embodiments where the parity information and actual data are mixed throughout all of the sectors of the disks.

Figure 3:
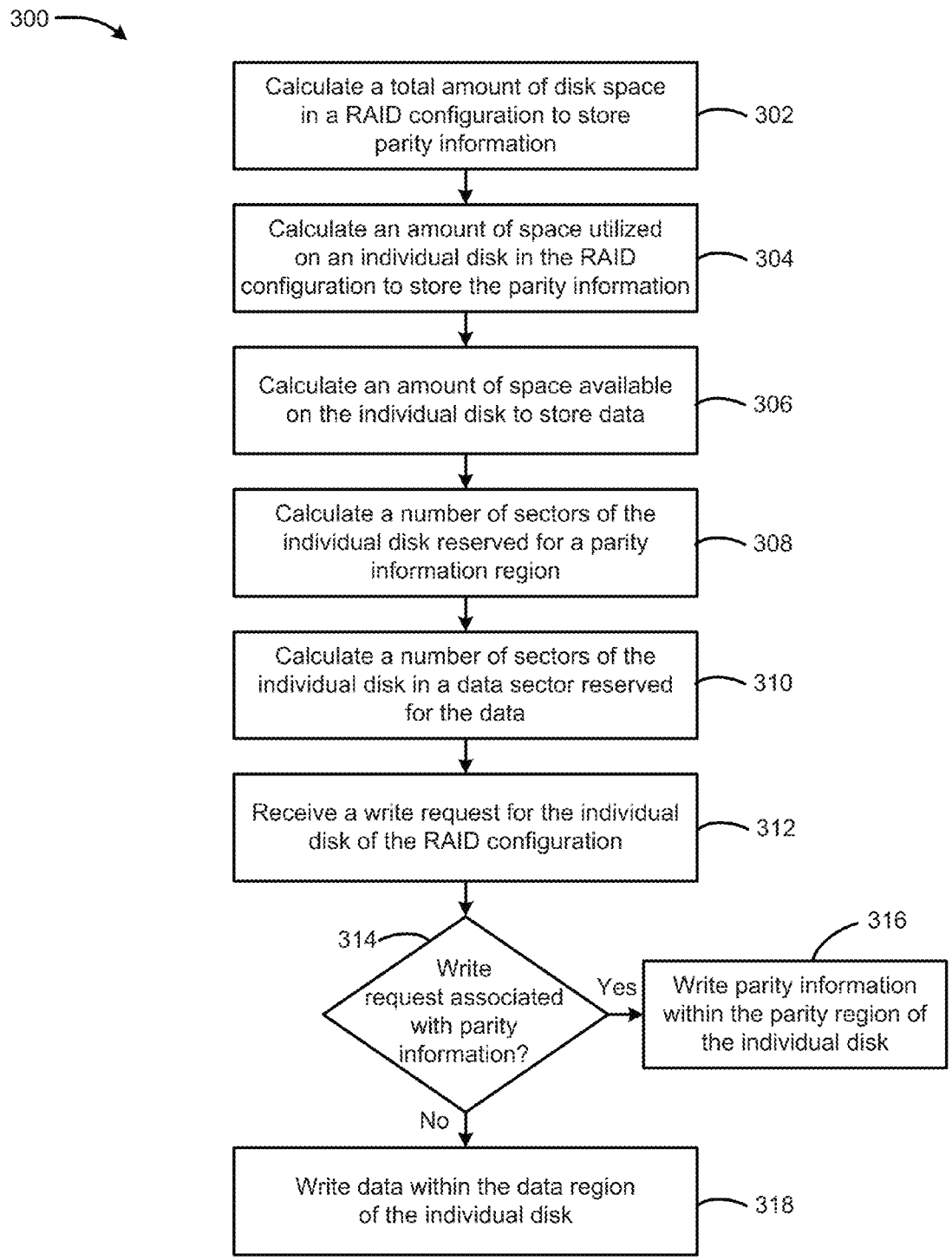
FIG. 3 is a flow diagram of a method for determining storage sectors on the disk.

FIG. 3 shows a flow diagram of a method 300 for determining storage sectors on a disk in a disk array of a RAID configuration. At block 302, a total amount of disk space in the RAID configuration to store parity information is calculated. In an embodiment, the parity information can be calculated based on the disk size of the smallest disk in the RAID configuration and the parity of the RAID configuration. For example, if the smallest disk size is 3 Tb and the RAID configuration is a RAID-5 solution with 3 disks having single parity, then the total disk space for the parity information across all of the disks can be 3 Tb. The flow then continues at block 304 and an amount of disk space utilized on an individual disk of the RAID configuration to store parity information is calculated. In an embodiment, the space on a single disk can be calculated based on the total disk space for parity information divided by the number of disks. At block 306, an amount of disk space available on one disk in the disk array for storing actual data is calculated. In an embodiment, the disk space for actual data can be calculated by subtracting the amount of disk space reserved for the parity information on the individual disk from the total amount of space on that disk.

At block 308, a number of sectors of the individual disk reserved for a parity information region is calculated. In an embodiment, the number of sectors for the parity information region can be calculated based on the total disk space on the individual disk reserved for the parity information divided by the size of a single sector on the disk. A number of sectors of the individual disk reserved for actual data region are calculated at block 310. In an embodiment, the number of sectors for the actual data region can be calculated based on the total disk space on the individual disk reserved for the actual divided by the size of a single sector on the disk. At block 312, a write request for the individual disk in the RAID configuration is received.

At block 314, a determination is made whether the write request is associated with parity information or with actual data. If the write request is associated with parity information, the parity information is written to the parity information region of the disk at block 316. In an embodiment, the parity information can be written from the inner most sector of the parity information region to the outer most sector of the region. At block 318, if the write request is not associated with parity information, the actual data is written to the data region of the disk. In an embodiment, the actual data can be written from the outer most sector of the data region to the inner most sector of the region.

Modifications, additions, or omissions may be made to the information handling system 100 described herein without departing from the scope of the disclosure. For example, information handling system 100 may include any number of controllers 106, processors 102, memories 104, disk arrays 108, or hard disk drives 110, 120, or 130. The components may be integrated or separated. Moreover, the operations may be performed by more, fewer, or other components. Additionally, the operations may be performed using any suitable logic comprising software, hardware, and/or other logic.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a plurality of storage disks arranged as a redundant array of independent disks; and
    a controller configured to communicate with each of the storage disks, wherein the controller determines a total amount of storage space utilized to store parity information within the storage disks based on a smallest disk size of the storage disks and a number of storage disks in the redundant array of independent disks, calculates an amount of storage space utilized to store parity information on each of the disks based on the total amount of storage space utilized to store parity information and the number of storage disks, and allocates innermost sectors within each of the storage disks as parity regions to store the parity information based on the amount of storage space utilized to store parity information on each of the storage disks.

2. The information handling system of claim 1 wherein the controller further calculates a number of sectors within the parity region based on the amount of storage space utilized to store the parity information divided by a size of each sector on a disk.

3. The information handling system of claim 1 the controller further to calculate an amount of storage space reserved for actual data within a data region of a disk based on the total amount of storage space on the disk minus the amount of storage space utilized to store the parity information on the disk.

4. The information handling system of claim 3 the controller further to calculate a number of sectors within the data region based on the amount of storage space reserved for the actual data divided by a size of each sector on a disk.

5. The information handling system of claim 1 wherein the controller receives a write request for a first disk of the storage disks, determines whether the write access is associated with parity information, and if the write access is associated with parity information then writes the parity information to the parity region of the first disk, otherwise writes actual data to a data region of the first disk.

6. The information handling system of claim 1 wherein each of the storage disks include a data region, wherein the data region is an outer most region of the disk.

7. The information handling system of claim 6 wherein access to the data region of each of the storage disks is faster than access to the parity region on the respective storage disk.

8. A method comprising:
determining, by a controller, a total amount of storage space utilized to store parity information within a plurality of disks a redundant array of independent disks;
calculating an amount of storage space utilized to store parity information on each of the disks based on the total amount of storage space and a number of disk within the redundant array of independent disks; and
allocating, by the controller, innermost sectors of each of the storage disks as a parity region of sectors within each of the storage disks to store the parity information, wherein the parity region is allocated to include the amount of storage space utilized to store the parity information on the disk.

9. The method of claim 8 further comprising:
calculating a number of sectors within the parity region based on the amount of storage space utilized to store the parity information divided by a size of each sector on a disk.

10. The method of claim 8 further comprising:
calculating an amount of storage space reserved for actual data within a data region of a disk based on the total amount of storage space on the disk minus the amount of storage space utilized to store the parity information on the disk.

11. The method of claim 10 further comprising:
calculating a number of sectors within the data region based on the amount of storage space reserved for the actual data divided by a size of each sector on a disk.

12. The method of claim 8 further comprising:
receiving a write request for a first disk of the storage disks;
determining whether the write access is associated with parity information; and
if the write access is associated with parity information, writing the parity information to the parity region of the first disk, otherwise writing actual data to a data region of the first disk.

13. The method of claim 8 wherein each of the storage disks include a data region, wherein the data region is an outer most region of the disk.

14. The method of claim 13 wherein accesses to the data region of each of the storage disks is faster than accesses to the parity region on the respective storage disk.

15. A method comprising:
determining a smallest disk size of a plurality of storage disks arranged in a redundant array of independent disks;
determining a number of storage disks in the redundant array of independent disks;
calculating a total amount of storage space utilized to store parity information on each of the disks based on the smallest disk size and the number of storage disks; and
allocating a first number of sectors on a first one of the storage disks as a parity region reserved for parity information, wherein the first number of sectors allocated as the parity region are innermost sectors of the first one of the storage disks and the parity region is allocated to include the amount of storage space utilized to store the parity information on the disk;
receiving a write request to write parity information to the first disk; and
writing the parity information within the parity region, wherein the parity information is written starting with an innermost sector of the parity region and moving to an outer most sector of the parity region.

16. The method of claim 15 further comprising:
calculating a number of sectors within the parity region based on the amount of storage space utilized to store the parity information on the first disk divided by a size of each sector on the first disk.

17. The method of claim 15 further comprising:
calculating an amount of storage space reserved for actual data within a data region of the first disk based on the total amount of storage space on the first disk minus the amount of storage space utilized to store the parity information on the first disk.

18. The method of claim 17 further comprising:
calculating a number of sectors within the data region based on the amount of storage space reserved for the actual data divided by a size of each sector on a disk.

19. The method of claim 18 wherein the data region is an outer most region of the disk.

20. The method of claim 19 wherein accesses to the data region of each of the storage disks is faster than accesses to the parity region on the respective storage disk.

* * * * *